United States Patent

Cao

[11] Patent Number: 5,135,290
[45] Date of Patent: Aug. 4, 1992

[54] AUTOMATIC CONTROL SYSTEM FOR ANTILOCKING AND ANTISKID APPLICATIONS

[75] Inventor: Chi-Thuan Cao, Korntal-Munchingen, Fed. Rep. of Germany

[73] Assignee: Robert Bosch GmbH, Stuttgart, Fed. Rep. of Germany

[21] Appl. No.: 613,481

[22] PCT Filed: Apr. 26, 1989

[86] PCT No.: PCT/EP89/00457
§ 371 Date: Oct. 26, 1991
§ 102(e) Date: Oct. 26, 1991

[87] PCT Pub. No.: WO89/10863
PCT Pub. Date: Nov. 16, 1989

[30] Foreign Application Priority Data

May 3, 1988 [DE] Fed. Rep. of Germany ....... 3814956

[51] Int. Cl.$^5$ .............. B60T 8/32; B60T 8/66; B60T 28/16
[52] U.S. Cl. ................... 303/100; 180/197; 188/181 T; 303/103; 303/104; 303/112; 303/95; 364/426.02; 364/426.03

[58] Field of Search ............... 303/100, 95, 102, 96, 303/103, 97, 104, 98, 105, 106, 107, 108, 109, 112, 91–110; 180/197; 364/426.01, 426.02, 426.03, 431.07; 188/181 T, 181 A, 181 R, 181 C; 123/357

[56] References Cited

U.S. PATENT DOCUMENTS 3,967,862 7/1976 Hunter et al.
4,733,760 3/1988 Inagaki et al. .................. 303/100
4,794,538 12/1988 Cao et al. ..................... 303/95 X

FOREIGN PATENT DOCUMENTS 2204092 8/1972 Fed. Rep. of Germany .
3625945 2/1987 Fed. Rep. of Germany .
3535843 4/1987 Fed. Rep. of Germany .

Primary Examiner—Douglas C. Butler
Attorney, Agent, or Firm—Felfe & Lynch

[57] ABSTRACT

Instantaneous coefficient of friction $\hat{\mu}(K)$ and slope $\hat{K}_\mu$ of the $\mu$-slip curve are evaluated from the drive torque or the brake torque and the wheel speeds. The values of $\hat{K}_\mu$ obtained by successive calculations constitute the feedback of the control system, which is compared with a target value $K_{\mu tar}$. The connection value thus obtained influences a final control element which modifies the braking pressure or, for example, the quantity of fuel per unit time. The control system gain varies with the adhesion coefficient $\hat{\mu}(K)$.

8 Claims, 1 Drawing Sheet

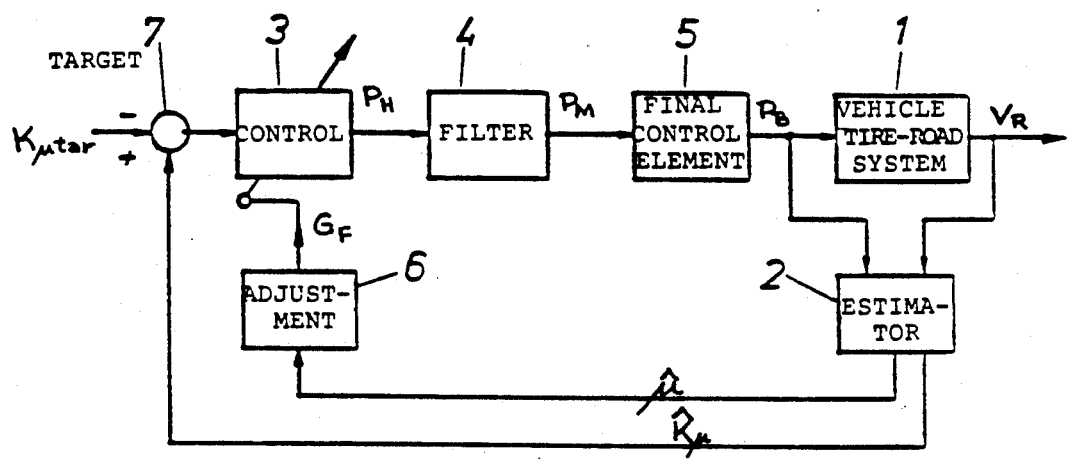

AUTOMATIC CONTROL SYSTEM FOR ANTILOCKING AND ANTISKID APPLICATIONS

BACKGROUND OF THE INVENTION

From DE-OS 35 35 843, for example, it is known to estimate parameters by using the measured speed of a wheel and the measured brake pressure in successive sensing times ... (T−1), T, (T−1) ... by means of a difference equation and by using known identification algorithms. These parameters are used to determine estimated values $\hat{\mu}_{(t)}$ for the friction coefficient between tire and road. The $\hat{\mu}$-values serve to determine the slope of the slippage curve $$K_\mu = \frac{d\hat{\mu}}{ds}$$

in the operating point and can be used in an anti lock brake control to achieve an optimal control. The slope $K_\mu$ of the $\mu$-curve serves as a control value, and the brake pressure is controlled such that $K_\mu$ corresponds to a small, positive value. The slippage selected is always one that is to the left of the maximum (on the stable portion) of the $\mu$-slippage curve, however, very close to the maximum.

SUMMARY OF THE INVENTION

The invention is based on the known control system and broadens it to include the ASR case and improves the system in that it makes the gain additionally dependent upon the determined $\hat{\mu}$ and correspondingly calculates the control amplifier.

In the ABS case, the continuous manipulated variable (e.g. the proportional valve) influences the brake pressure In the ASR case, in order to change the drive torque, the amount of fuel supplied per time unit, the ignition or the brake pressure at the driven wheels in dependency upon $\hat{K}_\mu$ are varied. In both cases, the wheel speed is measured and, further, a value corresponding to the brake torque and/or drive torque is determined (e.g. the brake pressure and/or the amount of fuel injected per time unit).

Since the manipulated variable is continuous, the control is hence also continuous.

Moreover, the control is adaptive since $\hat{K}_\mu$ is not measured directly but determined by parameter estimation. Further, the control parameters are constantly adjusted to the instantaneous $\mu$-values.

The control of the invention makes optimal or nearly optimal use of the frictional connection. Since there are no gear change thresholds, this control is user-oriented.

BRIEF DESCRIPTION OF THE DRAWING

The single figure shows a control circuit in an ABS application.

DETAILED DESCRIPTION OF THE PREFERRED EMBODIMENT

In the figure, the vehicle-tire-road-system bears reference numeral 1. A brake pressure $P_B$ is supplied to this system. The wheel speed $V_R$ is indicated as an output value on the right side. Signals corresponding to the values $P_B$ and $V_R$ are supplied to an estimator 2. The latter supplies at successive sensing times K estimated values $\hat{\mu}_{(t)}$ and $T_\mu$ the instantaneous friction coefficient and/or the instantaneous slope of the $\mu$-slippage curve. This is carried out in a manner known from DE-OS 3535843 or in any other known or in ways still to be found. The estimated value $\hat{K}_\mu$ is supplied to the subtractor 7 as an actual value. Also supplied thereto is a small positive value $K_{\mu tar}$ as a target value. Then, the difference of the actual value signals and the target value $K_{\mu tar}$ is, as a control value, supplied to a control amplifier 3. Preferably, the control amplifier 3 exhibits proportional and integral behavior. As will be shown later, it will be adjusted to the instantaneous $\hat{\mu}_{(t)}$. The output signal $P_H$ thereof is filtered in a filter 4. The so resulting value $P_M$ influences a continuously adjustable final control element, e.g. a proportioning valve, via which the necessary brake pressure $P_B$ is supplied to the wheel brake (in 1).

In order to achieve an improved dynamic behavior and an improved stability of the control loop, an adjusting element 6 is used to continuously adjust the gain factor $K_R$ of the control amplifier 3 in dependency upon the determined $\hat{\mu}_{(t)}$. This is preferably done according to the following rule:

Initial setting: $K_R = K_{R,O}$ (for the best but still stable selection, e.g. for $\hat{\mu} = 0.1$)

Adjustment factor: $G_F = 1 - \sigma \cdot \hat{\mu} = \begin{cases} G_{F,min} \text{ for } G_F < G_{F,min} \\ G_{F,max} \text{ for } G_F > G_{F,max} \end{cases}$ Adjustment: $K_R = \dfrac{K_{R,O}}{G_F}$ Based on the initial setting $K_{R,O}$ of the gain factor, an adjustment factor $G_F$ is calculated in each calculation step (=sensing interval $T_A$). This adjustment factor $G_F$ then determines the new selection $K_R$. Further, it is dependent upon $\mu$, with $\sigma$ being the adjusting speed. $\sigma$ can again be selected as constant or in dependency upon $\hat{\mu}(\hat{\mu}=$ large, then $\sigma =$ large).

The control circuit for an ASR-case differs from the one of the single figure in that the input value of the vehicle-tire-road system is not the brake pressure but, for example, the amount of fuel $M_E$ supplied to the engine per time unit. This amount is, for example, measured and supplied to the estimator 2 which determines $\hat{\mu}_{(t)}$ and $\hat{K}_\mu$. Here too, the actual value is $\hat{K}_\mu$ and the target value is again $K_{\mu,tar} \approx 0$ or equal to 0. The signals at the outputs of the elements 3 and 4 do not correspond to pressures but to amounts of fuel per time unit. Manipulated values for this purpose are, for example, known in connection with E-gas.

I claim:

1. System for controlling torque at a vehicle wheel moving at a speed, said torque being one of driving torque or braking torque, said wheel upon application of torque exhibiting slippage characterized by a $\mu$-slippage curve having a stable portion, an unstable portion, and a maximum therebetween, said system comprising
   means for measuring the speed of said vehicle wheel and producing a wheel speed signal,
   means for determining the torque applied to said vehicle wheel and producing a wheel torque signal,
   means for estimating an instantaneous friction coefficient $\hat{\mu}(t)$ and a corresponding instantaneous slope $\hat{K}_\mu$ of the $\mu$-slippage curve from said wheel speed signal and said wheel torque signal at respective sensing times (T−1), T, (T+1) ... , means for determining a difference between $\hat{K}_\mu$ and a target slope $\hat{K}_{\mu tar}$ on the stable portion of said $\mu$-slippage curve.

a control amplifier which generates an output signal from said difference, said control amplifier having a gain factor $K_R$ which changes in dependence upon the instantaneous friction coefficient $\hat{\mu}(t)$, and a final control element which generates said wheel torque signal from said output signal.

2. System as in claim 1 wherein said gain factor is changed in proportion to the instantaneous friction coefficient $\hat{\mu}(t)$.

3. System as in claim 2 wherein said gain factor is changed according to the equation $K_R = K_{RO}/(1-\sigma\mu)$, where $K_{RO}$ is an initial setting and $\sigma$ is an adjustment speed.

4. System as i claim 3 further comprising adjustment means which limits an adjustment factor $G_F = 1 - \sigma\mu$ by minimum and maximum values.

5. Method for controlling torque at a vehicle wheel moving at a speed, said torque being one of driving torque or braking torque, said wheel upon application of torque exhibiting slippage characterized by a $\mu$-slippage curve having a stable portion, an unstable portion, and a maximum therebetween, said method comprising measuring the speed of said vehicle wheel and producing a wheel speed signal, determining the torque applied to said vehicle wheel and producing a wheel torque signal, estimating an instantaneous friction coefficient $\hat{\mu}(t)$ and a corresponding instantaneous slope $\hat{K}_\mu$ of the $\mu$-slippage curve from said wheel speed signal and said wheel torque signal at respective sensing times $(T-1), T, (T+1) \ldots$, determining a difference between $\hat{K}_\mu$ and a target slope $K\mu$tar on the stable portion of said $\mu$-slippage curve, generating an output signal from said difference using a gain factor $K_R$ which changes in dependence upon the instantaneous friction coefficient $\hat{\mu}(t)$, and generating said wheel torque signal from said output signal.

6. Method as in claim 5 wherein said gain factor $K_R$ changes in proportion to the instantaneous friction coefficient $\hat{\mu}(t)$.

7. Method as in claim 6 wherein said gain factor changes according to the equation $K_R = K_{RO}/(1-\sigma\mu)$, where $K_{RO}$ is an initial setting and $\sigma$ is an adjustment speed.

8. Method as in claim 7 wherein an adjustment factor $G_F = 1 - \sigma\mu$ is limited by minimum and maximum values.

* * * * *

UNITED STATES PATENT AND TRADEMARK OFFICE
CERTIFICATE OF CORRECTION

PATENT NO. : 5,135,290

DATED : August 4, 1992

INVENTOR(S) : Chi-Thuan Cao

It is certified that error appears in the above-identified patent and that said Letters Patent is hereby corrected as shown below:

Column 1, line 9, replace "(T-1), T, (T-1)" with
    -- (T-1), T, (T+1) --.

Column 1, line 65, delete "times K" and insert -- times T --.

Signed and Sealed this

Twenty-sixth Day of April, 1994

*Attest:*

BRUCE LEHMAN

*Attesting Officer*   *Commissioner of Patents and Trademarks*